United States Patent [19]
DeKoning et al.

[11] Patent Number: 5,883,909
[45] Date of Patent: Mar. 16, 1999

[54] METHOD AND APPARATUS FOR REDUCING DATA TRANSFERS ACROSS A MEMORY BUS OF A DISK ARRAY CONTROLLER

[75] Inventors: Rodney A. DeKoning; Dennis E. Gates; Charles D. Binford, all of Wichita, Kans.

[73] Assignee: LSI Logic Corporation, Milpitas, Calif.

[21] Appl. No.: 744,653

[22] Filed: Nov. 6, 1996

[51] Int. Cl.[6] ............................................. G06F 11/10
[52] U.S. Cl. .................... 371/49.1; 371/49.2; 371/68.2
[58] Field of Search ............................... 371/49.1, 49.2, 371/48, 11.2, 68.2

[56] References Cited

U.S. PATENT DOCUMENTS

| | | | |
|---|---|---|---|
| 4,823,347 | 4/1989 | Chin et al. | 371/49 |
| 5,146,588 | 9/1992 | Crater et al. | 395/575 |
| 5,373,512 | 12/1994 | Brady | 371/40.1 |
| 5,388,108 | 2/1995 | DeMoss et al. | 37/51.1 |
| 5,396,620 | 3/1995 | Burghart et al. | 395/575 |
| 5,412,668 | 5/1995 | Dewey | 371/40.1 |
| 5,469,566 | 11/1995 | Hohenstein et al. | 395/182.04 |
| 5,479,611 | 12/1995 | Oyama | 395/185.01 |
| 5,490,248 | 2/1996 | Dan et al. | 395/182.04 |

FOREIGN PATENT DOCUMENTS

| | | | |
|---|---|---|---|
| 0767420 | 12/1994 | European Pat. Off. | G06F 3/06 |
| 0768607 | 4/1997 | European Pat. Off. | G06F 11/10 |

*Primary Examiner*—Phung M. Chung
*Attorney, Agent, or Firm*—Paul J. Maginot; Wayne P. Bailey

[57] ABSTRACT

A method and apparatus for transferring data from a first device to a second device connected by a controller having a parity buffer and a memory having a first storage and a second storage is disclosed. The method includes the steps of transferring first data from the first device to the first storage; transferring second data from the first device to the second storage; transferring the first data to the second device and storing the first data in the parity buffer; and determining parity data from the second data and the first data stored in the parity buffer.

19 Claims, 4 Drawing Sheets

METHOD AND APPARATUS FOR REDUCING DATA TRANSFERS ACROSS A MEMORY BUS OF A DISK ARRAY CONTROLLER

BACKGROUND OF THE INVENTION

The present invention relates generally to disk array controllers, and more particularly to a method and apparatus for reducing data transfers across a memory bus of a disk array controller.

RAID (Redundant Array of Inexpensive Disks) storage devices have emerged as an alternative to large, expensive disk drives for use with present and future computer system architectures. A RAID storage device typically includes an array of small, inexpensive hard disk drives, such as the 5¼ or 3½ inch disk drives currently used in personal computers and workstations. Although disk array devices have been available for several years, significant improvements in the reliability and performance of small disk drives, and a decline in the cost of such disk drives have resulted in an enhanced interest in RAID systems.

Current RAID disk array design alternatives are described in a publication entitled "The RAIDbook: A Source Book for RAID Technology" third edition, May, 1994 which is available from the RAID Advisory Board, and which is incorporated herein by reference. The publication discusses the different levels of RAID disk arrays and the improvements in performance, reliability, power consumption and scaleability that RAID disk arrays provide in comparison to single large magnetic disks. The present invention is primarily directed to improvements in the operation of controllers for RAID Level 3, 4 and 5 disk array devices, and to any other disk array devices which determine parity information dependent upon the data to be written to or read from the disk array.

Figure 1:
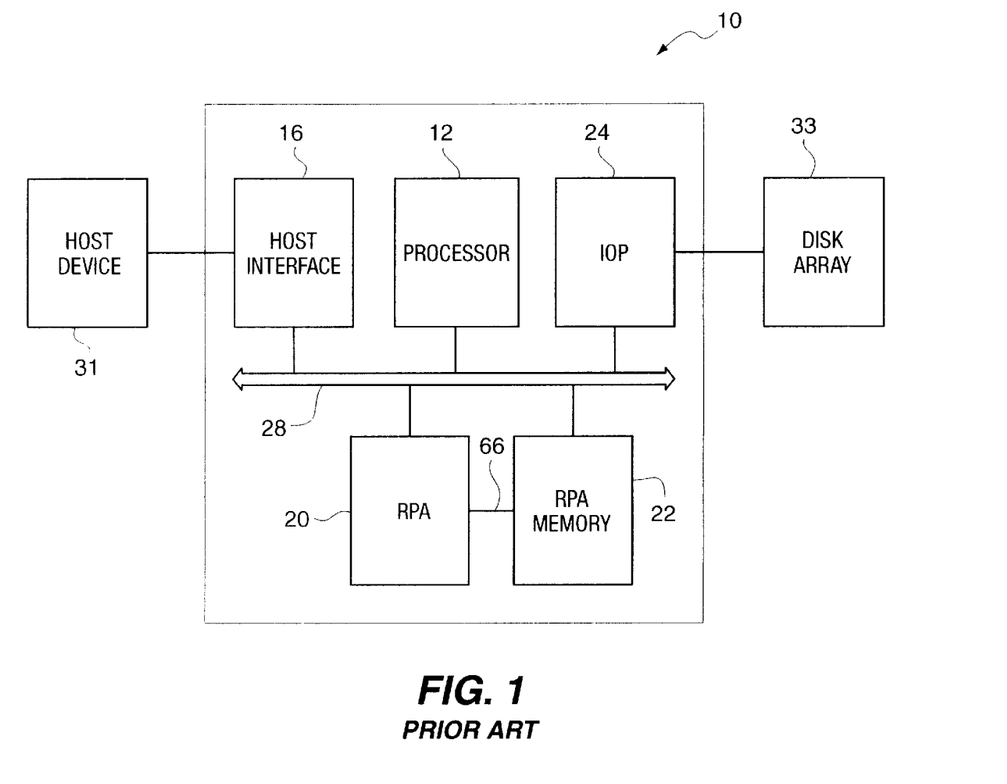
FIG. 1 is a simplified block diagram of a known disk array controller.

Referring now to FIG. 1, there is shown a simplified block diagram of a known disk array controller 10 which is operatively coupled between a host device 31 and a RAID disk array 33. The known controller 10 includes processor 12, host interface circuit 16, one or more input/output processors (IOP) 24, RAID Parity Assist (RPA) circuit 20, RPA memory 22, system bus 28 and memory bus 66. The host device 31 is operatively coupled to the known controller 10 through the host interface 16, and the disk array 33 is operatively coupled to the controller 10 through the IOP 24. Processor 12, host interface 16, IOP 24, and RPA circuit 20 are operatively interconnected through the system bus 28. Furthermore, the RPA memory 22 is operatively coupled to the RPA circuit 20 through the memory bus 66 and is implemented with known DRAM memory circuits.

During write operations, the known controller 10 receives write data from the host device 31 to store in the disk array 33. In particular, write data is received by the controller 10 from the host device 31 and transferred across the system bus 28 and memory bus 66 for temporary storage in the RPA memory 22. The processor 12 schedules the write data to be transferred from the RPA memory 22 across the memory bus 66 to the RPA circuit 20 in order to generate parity information for the write data. The resulting parity information is transferred across the memory bus 66 for temporary storage in the RPA memory 22. Finally, the processor 12 schedules the write data and the accompanying parity information to be written out of the RPA memory 22, across the memory bus 66 and system bus 28, and to the disk array 33 for storage therein.

Thus, during write operations, for one unit of data transferred to the disk array 33, approximately three units of data and two units of parity information are transferred across the memory bus 66. For example, in a RAID Level 3 disk array 33 having a stripe size of 5 chunks (4 data chunks and 1 parity chunk where a chunk is defined as the amount of contiguous storage of an array virtual disk that is mapped to contiguous storage on a single member disk of the disk array), approximately 14 chunks of data are transferred across the memory bus 66 for each transfer of 4 data chunks from the host device 31 to the disk array 33. That is, approximately 3.5 (14 chunks /4 data chunks) data transfers occur across the memory bus 66 for each unit of data (4 chunks) transferred from the host device 31 to the disk array 33.

During degraded read operations (i.e. a read operation where one of the disk drives associated with the disk array 33 has failed in some respect), the controller 10 requests read data from the disk array 33 in response to a read request from the host device 31. In particular, read data and parity information are received by the controller 10 from the functioning disk drives associated with the disk array 33 and transferred across the system bus 28 and memory bus 66 for temporary storage in the RPA memory 22. The processor 12 schedules the read data and parity information from the RPA memory 22 to be transferred across the memory bus 66 to the RPA circuit 20 in order to recover the read data from the failed disk drive. The recovered read data is transferred across the memory bus 66 for temporary storage in the RPA memory 22. Finally, the processor 12 schedules the read data, including the read data recovered from the failed disk drive, to be transferred from the RPA memory 22, across the memory bus 66 and system bus 28, and to the host device 31.

Thus, during degraded read operations, for one unit of data transferred from the disk array 33, approximately three units of data and one unit of parity information are transferred across the memory bus 66. For example, in a RAID Level 3 disk array 33 having a stripe size of 5 chunks (4 data chunks and 1 parity chunk, where a chunk is defined as the amount of contiguous storage of an array virtual disk that is mapped to contiguous storage on a single member disk of the disk array), approximately 13 chunks of data are transferred across the memory bus 66 for each transfer of 4 data chunks between the host device 31 and the disk array 33. That is, approximately 3.25 (13 chunks /4 data chunks) data transfers occur across the memory bus 66 for each unit of data (4 chunks) transferred from disk array 33 to the host device 31.

This multiplicity of data transfers back and forth across the memory bus 66 for each desired unit of data transfer may create a bottleneck condition in the known controller 10. This bottleneck condition may greatly reduce the data throughput of the known controller 10. What is needed therefore, is a method and apparatus which improves the throughput of a disk array controller by reducing the number of data transfers across the memory bus of the controller per unit of data transferred between a host device and a disk array.

SUMMARY OF THE INVENTION

In accordance with one embodiment of the present invention, there is provided a method for transferring data from a first device to a second device connected by a controller having a parity buffer and a memory having a first storage and a second storage. The method includes the steps of transferring first data from the first device to the first storage; transferring second data from the first device to the second storage; transferring the first data to the second device and storing the first data in the parity buffer; and determining parity data from the second data and the first data stored in the parity buffer.

Pursuant to another embodiment of the present invention, there is provided a method for transferring data from a first device to a second device connected by a controller having a parity buffer and a memory having a first storage and a second storage. The method includes the steps of transferring first data from the first device to the first storage and storing the first data in the parity buffer; transferring second data from the first device to the second storage and determining parity data from the second data and the first data stored in the parity buffer; and transferring the first data to the second device.

Pursuant to yet another embodiment of the present invention, there is provided a disk array controller for connecting a host device to a disk array having a first disk, a second disk, and a third disk. The disk array controller includes a memory, a parity buffer, a parity generator, and a parity controller. The parity generator is coupled to the parity buffer. The parity controller is coupled to the memory and the parity generator. The memory includes a first storage and a second storage. The parity controller is configured to transfer first data from the first disk to the first storage, is configured to transfer second data from the second disk to the second storage, is configured to transfer the first data from the first storage to the host device and to the parity generator, and is configured to transfer the second data from the second storage to the parity generator. Furthermore, the parity generator is configured to determine parity data from the second data and the first data stored in the parity buffer.

In yet another embodiment of the present invention, there is provided a disk array controller for connecting a host device to a disk array having a first disk, a second disk, and a third disk. The disk array controller includes a memory, a parity buffer, a parity generator, and a parity controller. The parity generator is coupled to the parity buffer. The parity controller is coupled to the memory and the parity generator. The memory includes a first storage and a second storage. The parity controller is configured to transfer first data from the host device to the first storage and to the parity generator, is configured to transfer second data from the host device to the second storage and to the parity generator, is configured to transfer the first data from the first storage to the first disk, is configured to transfer the second data from the second storage to second disk, and is configured to transfer parity data from the parity generator to the third disk. Furthermore, the parity generator is configured to store the first data in the parity buffer; and is configured to determine the parity data from the second data and the first data stored in the parity buffer.

It is therefore an object of the present invention to provide a new and useful method for transferring data in a controller.

It is therefore an object of the present invention to provide an improved method for transferring data in a controller.

It is another object of the present invention to provide a new and useful controller.

It is another object of the present invention to provide an improved controller.

It is a further object of the present invention to provide a controller with enhanced throughput of disk array data transfers.

It is yet another object of this invention to provide a method for enhancing throughput of disk array data transfers in a controller.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. Furthermore, while the present invention is primarily described in reference to a RAID Level 3 disk array device, the present invention is directed to improvements in the operation of controllers for RAID Level 3, 4 and 5 disk array devices, and to any other disk array devices which determine parity information dependent upon the data to be written to or read from the disk array. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
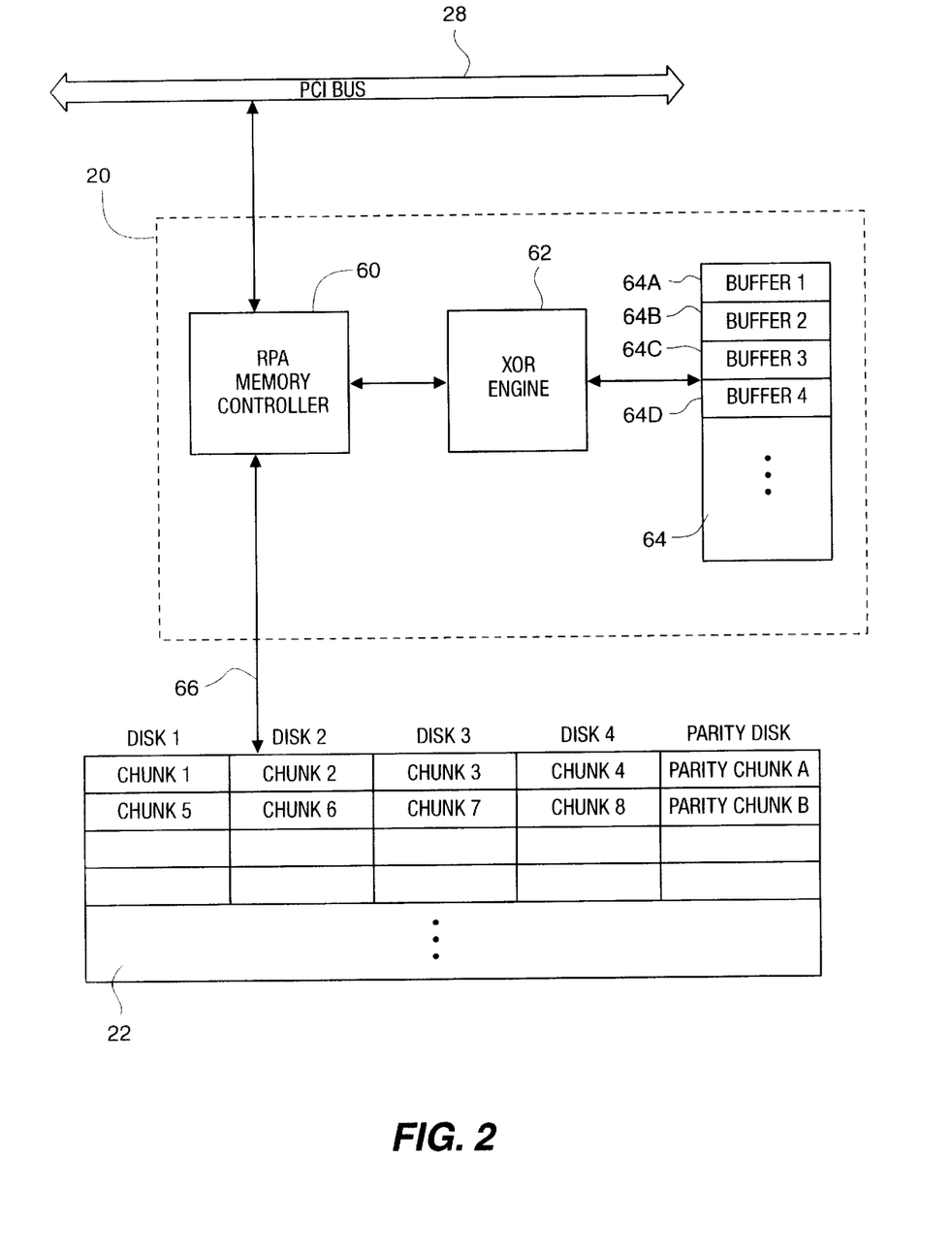
FIG. 2 is a block diagram of an improved RAID Parity Assist (RPA) circuit and an RPA memory of FIG. 1 which incorporates features of the present invention therein.

Referring now to FIG. 2, there is shown a block diagram of an improved RPA circuit 20 for the disk array controller of FIG. 1 which incorporates the features of the present invention therein. The RPA circuit 20 includes a RPA memory controller 60, exclusive-OR (XOR) engine 62, and intermediate parity buffer 64. The RPA memory controller 60 is operatively coupled to the system bus 28 and is operatively coupled to the RPA memory 22 via a memory bus 66. The RPA memory controller 60 is also operatively coupled to the intermediate parity buffer 64 via the XOR engine 62. The RPA memory controller 60 controls (1) the flow of data between the system bus 28, the RPA memory 22, and the intermediate parity buffer 64, and (2) the operation of the XOR engine 62.

The XOR engine 62 primarily performs a bit-wise XOR operation on data stored in the intermediate parity buffer 64 with data received from the RPA memory controller 60 as described further below. The XOR engine 62 may also store and/or retrieve data in the intermediate parity buffer 64 without performing an XOR operation thereon.

The RPA memory 22 permits the intermediate storage of blocks of read data (i.e. data read from the disk array 33 which is sent to the host device 31) and blocks of write data (i.e. data received from the host device 31 which is written to the disk array 33). As a result, the RPA memory 22 provides a caching function wherein the disk array controller 10 may utilize read/write data stored in the RPA memory 22 instead of accessing one or more of the disk drives associated with the disk array 33. In addition, the RPA memory 22 permits the disk array controller 10 to perform multiple read operations and write operations concurrently. In the embodiment being described, the RPA memory 22 may be implemented as Dynamic Random Access Memory (DRAM).

The intermediate parity buffer 64 may define one or more buffer locations 64a–64d for storing intermediate parity information that is generated during read/write data transfers across the system bus 28 as described further below. The multiple buffer locations 64a–64d permit the disk array controller 10 to concurrently perform multiple read/write data transfers to and from the disk array 33, as well as to perform read/write data transfers involving multiple blocks of data per each disk drive of the disk array 33.

In the embodiment being described, the intermediate parity buffer 64 may be integrated with the RPA memory controller 60 and the XOR engine 62 into a single integrated circuit in order to maximize the data transfer rates therebetween. It should be appreciated that the size of an integrated intermediate parity buffer 64 is relatively small (e.g. 32 kilobytes) due to current technology and manufacturing buffs. Larger integrated intermediate parity buffers 64, however, are contemplated with advances in the technology and may result in an increase in performance. Furthermore, intermediate parity buffer 64 may be implemented as a separate circuit which may result in a larger intermediate parity buffer 64. However, current manufacturing costs associated with providing a high speed interface between separate circuits currently make this option cost ineffective.

In the embodiment being described, the disk array 33 may include five disk drives, and may be implemented as a RAID Level 3 disk array with four of the five disk drives used exclusively for the storage of data, and the fifth disk drive used exclusively for the storage of parity information. Thus, the disk array 33 has a stripe size of 5 chunks with a first chunk of data (chunk 1) stored on a first data disk drive (disk 1), a second chunk of data (chunk 2) stored on a second data disk drive (disk 2), a third chunk of data (chunk 3) stored on a third data disk drive (disk 3), a fourth chunk of data (chunk 4) stored on a fourth data disk drive (disk 4), and a first chunk of parity information (parity chunk A) corresponding to chunks 1–4 of the stripe, stored on a fifth or parity disk drive of the disk array 33. It should be appreciated that the minimum chunk size of a RAID Level 3 disk array is small compared to the user visible sector size of the disk array 33, so that all disk drives in the disk array 33 participate in the execution of every input/output request from the host device 31.

Figure 3:
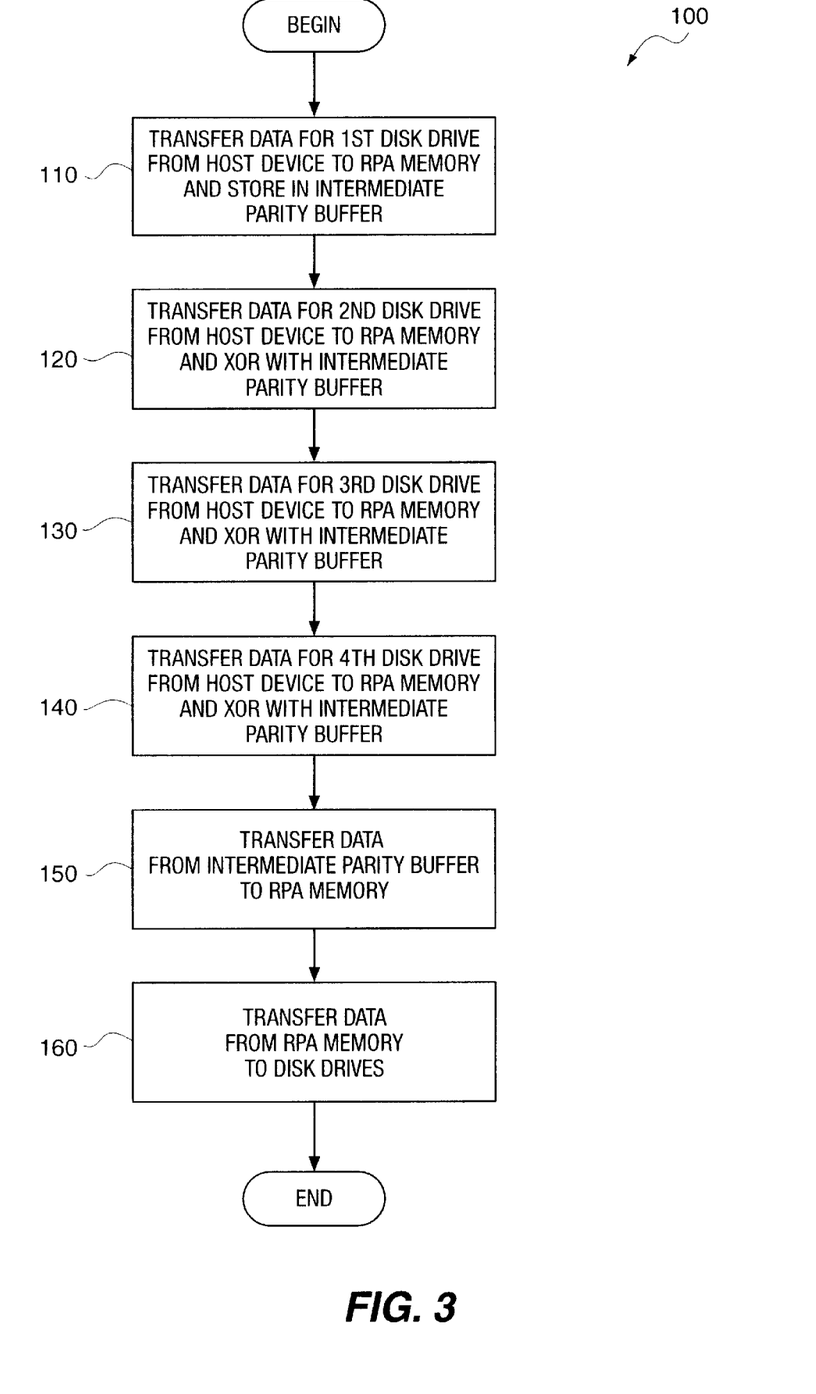
FIG. 3 is a flowchart illustrating a write request routine which is executed by a disk array controller which incorporates features of the present invention therein.

Referring now to FIG. 3, there is shown a write request routine 100 which is executed by the disk array controller 10. The routine 100 may be initiated when the host device 31 requests that a stripe of data be written to the disk array 33.

In response to the write request from the host device 31, the disk array controller 10 causes a first chunk of data (chunk 1) to be transferred to the RPA memory 22 and to the intermediate parity buffer 64 (step 110). With reference to FIG. 1 and FIG. 2, chunk 1 is transferred from the host device 31, through the host interface circuit 16, across the system bus 28, through the RPA memory controller 60, across the memory bus 66 and into the RPA memory 22. This chunk transfer like the others that follow may be directly controlled by the processor 12 or by a DMA engine which may be part of the RPA memory controller 60 or the IOP 24. While chunk 1 is transferred through the RPA memory controller 60 to the RPA memory 22, the RPA memory controller causes chunk 1 to be transferred to the XOR engine 62. The XOR engine then causes chunk 1 to be stored in buffer location 64a of the intermediate parity buffer 64.

The disk array controller 10 then causes a second chunk of data (chunk 2) to be transferred to the RPA memory 22 and to the intermediate parity buffer 64 (step 120). As with chunk 1, chunk 2 is transferred from the host device 31, through the host interface circuit 16, across the system bus 28, through the RPA controller memory 60, across the memory bus 66 and into the RPA memory 22. While chunk 2 is transferred through the RPA memory controller 60 to the RPA memory 22, the RPA memory controller 60 also causes chunk 2 to be transferred to the XOR engine 65. The XOR engine 62 then causes chunk 2 to be bit-wise XORed with the data stored in buffer location 64a of the intermediate parity buffer 64.

In step 130, the disk array controller 10 causes a third chunk of data (chunk 3) to be transferred to the RPA memory 22 and to the intermediate parity buffer 64. Chunk 3, like chunk 1 and chunk 2 above, is transferred from the host device 31, through the host interface circuit 16, across the system bus 28, through the RPA controller memory 60, across the memory bus 66 and into the RPA memory 22. While chunk 3 is transferred through the RPA memory controller 60 to the RPA memory 22, the RPA memory controller 60 also causes chunk 3 to be transferred to the XOR engine 62. The XOR engine 62 then causes chunk 3 to be bit-wise XORed with the data stored in the buffer location 64a.

The disk array controller 10 in step 140 causes a fourth chunk of data (chunk 4) to be transferred to the RPA memory 22 and to the intermediate parity buffer 64. Like chunks 1, 2 and 3 above, chunk 4 is transferred from the host device 31, through the host interface circuit 16, across the system bus 28, through the RPA controller memory 60, across the memory bus 66 and into the RPA memory 22. While chunk 4 is transferred through the RPA memory controller 60 to the RPA memory 22, the RPA memory controller 60 also causes chunk 4 to be transferred to the XOR engine 62. The XOR engine 62 then causes chunk 4 to be bit-wise XORed with the data stored in the buffer location 64a.

After step 140 is complete, the buffer location 64a contains parity information (parity chunk A) for data chunks 1–4. In step 150, the RPA memory controller 60 causes parity chunk A to be transferred from the buffer location 64a to the RPA memory 22. In particular, the RPA memory controller 60 causes the XOR engine 62 to retrieve parity chunk A from buffer location 64a and to send parity chunk A to the RPA memory controller 60. The RPA memory controller 60 then transfers parity chunk A across the memory bus 66 for temporary storage in the RPA memory 22.

Once the write data (chunks 1–4) and parity chunk A are stored in the RPA memory 22, the processor 12 schedules a write operation for transferring the write data and parity information to the disk array 33 (step 160). In particular, the processor 12 schedules chunk 1 to be transferred to disk 1, chunk 2 to be transferred to disk 2, chunk 3 to be transferred to disk 3, chunk 4 to be transferred to disk 4, and parity chunk A to be transferred to the parity disk 5 of the disk array 33. When the scheduled write operation is executed, the write data (chunks 1–4) and parity chunk A are transferred out of the RPA memory 22, across the memory bus 66, through RPA memory controller 60, across the system bus 28, through the IOP 24 and to the respective disk drives associated with the disk array 33.

It should be appreciated that the write request routine 100 reduces the data traffic across the memory bus 66 when compared to a similar write request operation performed by the prior art. In particular, the number of chunks (Y) that are transferred across the memory bus 66 when executing routine 100 may be determined from equation (1):

$$Y = \left(2 + \frac{2}{N}\right) \cdot X \quad (1)$$

where X is the number of data chunks to be transferred to the disk array 33, N is the number of data disk drives associated with the disk array 33, and Y is the resulting number of data and parity chunks transferred across the memory bus 66 as a result of transferring X data chunks.

Therefore, from the above equation, disk array controller 10 transfers ten chunks across the memory bus 66 in order to transfer a stripe of five chunks (four data chunks and one parity chunk). That is:

$$Y = \left(2 + \frac{2}{4}\right) \cdot 4 = 10$$

Thus, in the embodiment being described, execution of routine 100 provides an approximately 30% reduction (14 chunks–10 chunks)/14 chunks in data traffic across the memory bus as compared to the prior art.

It should further be appreciated that if the size of the chunk is larger than each of the buffers 64a–64d of the intermediate parity buffer 64, then each chunk may be broken up into sub-chunks that are small enough to be stored within a buffer of the intermediate parity buffer 64. Once the chunks are broken up into sub-chunks, the above method 100 may be implemented in at least two different ways. One implementation is to use multiple buffers 64a–64d and transfer all the sub-chunks of a disk before moving on to the next disk. This method can viewed as creating from the buffers 64a–64d of the intermediate parity buffer 64 a buffer which is large enough to hold a chunk. Therefore, this implementation follows the method 100 except that it makes multiple transfers at each step.

Another implementation is to use only one of the buffers of the intermediate parity buffer 64. This implementation transfers a sub-chunk from each disk as described by method 100 but skips step 160. This implementation repeats this process until all the sub-chunks and parity sub-chunks are in the RPA memory 22. Once all the sub-chunks and parity sub-chunks for the stripe are in the RPA memory 22, this implementation executes step 160 which transfers all the sub-chunks and parity sub-chunks for the stripe to the disk array 33.

Figure 4:
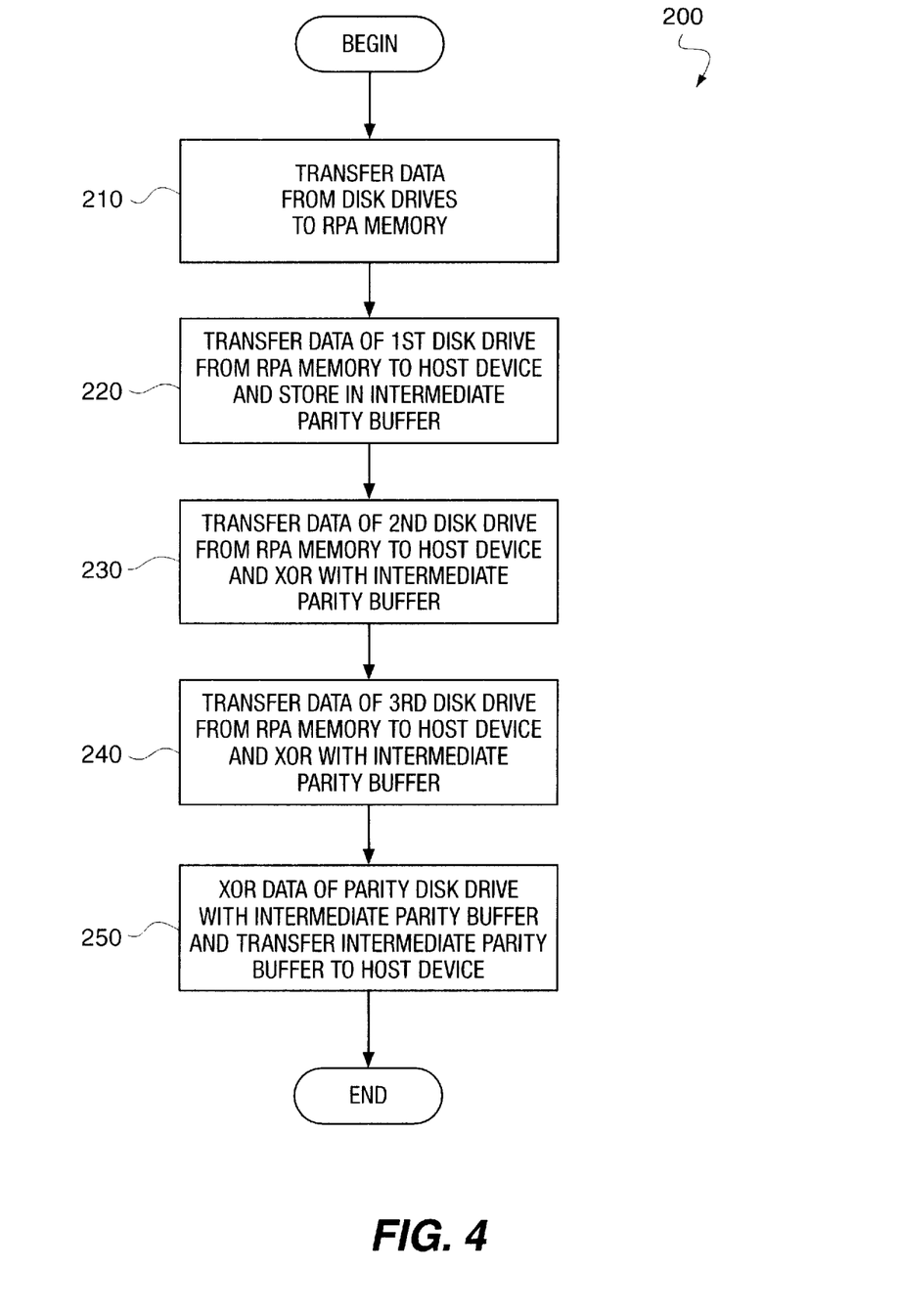
FIG. 4 is a flowchart illustrating a degraded read request routine which is executed by a disk array controller which incorporates features of the present invention therein.

Referring now to FIG. 4, there is shown a degraded read request routine 200 which may be executed by the disk array controller 10 when a disk drive associated with the disk array 33 has failed. For example, if disk 2 which contains chunk 2 has failed, the disk array controller 10 must obtain valid read data from the remaining three functioning data disk drives of the disk array 33 (disks 1, 3 and 4) and from the parity disk drive (disk 5).

The routine 200 may be initiated when the host device 31 requests that a stripe be read from the disk array 33. In response to the read request from the host device 31, the processor 12 causes valid read data to be transferred from the disk array 33 to the RPA memory 22 (step 210). With reference to FIG. 1 and FIG. 2, since disk 2 has failed, the processor 12 causes data chunks 1, 3, 4, and parity chunk A to be transferred from disks 1, 3, 4, and 5, through the IOP 24, across the system bus 28, through the RPA memory controller 60, across the memory bus 66 and into the RPA memory 22.

Once chunks 1, 3 and 4 and parity chunk A are stored in the RPA memory 22, the disk array controller 10 causes chunk 1 to be transferred to the host device 31 and to the intermediate parity buffer 64 (step 220). In particular, chunk 1 is transferred out of the RPA memory 22, across the memory bus 66, through the RPA memory controller 60, across the system bus 28, and through the host interface circuit 16 to the host device 31. While chunk 1 is transferred through the RPA memory controller 60 to the host device 31, RPA memory controller 60 also causes chunk 1 to be transferred to the XOR engine 62. The XOR engine 62 then stores chunk 1 in buffer location 64a of intermediate parity buffer 64.

In step 230, the disk array controller 10 then causes chunk 3 to be transferred to the host device 31 and to the intermediate parity buffer 64. As with chunk 1, chunk 3 is transferred from the RPA memory 22 across the memory bus 66, through the RPA memory controller 60, across the system bus 28, and through the host interface circuit 16 to the host device 31. While chunk 3 is transferred through the RPA memory controller 60 to the host device 31, the RPA memory controller 60 also causes chunk 3 to be transferred to the XOR engine 62. The XOR engine 62 then causes chunk 3 to be bit-wise XORed with the data stored in the buffer location 64a of the intermediate parity buffer 64.

The disk array controller 10 in step 240 causes chunk 4 to be transferred to the host device 31 and to the intermediate parity buffer 64. Like chunks 1 and 3 above, chunk 4 is transferred from the RPA memory 22 across the memory bus 66, through the RPA memory controller 60, across the system bus 28, and through the host interface circuit 16 to the host device 31. While chunk 4 is transferred through the RPA memory controller 60 to the host device 31, the RPA memory controller 60 also causes chunk 4 to be transferred to the XOR engine 22. The XOR engine then causes chunk 4 to be bit-wise XORed with the data stored in the buffer location 64a of the intermediate parity buffer 64.

In step 250, the disk array controller 10 causes chunk 2 to be recovered and sent to the host device 31. In particular, the RPA memory controller 60 causes the parity chunk A stored in the RPA memory 22 to be transferred across the memory bus 66, through the RPA memory controller 60, and to the XOR engine 62. The XOR engine 62 then causes the parity chunk A to be bit-wise XORed with the data stored in buffer location 64a. When step 250 is complete, the buffer location 64a contains a restored copy of chunk 2 which was stored on the failed disk 2.

The RPA memory controller 60 causes the XOR engine 62 to retrieve data chunk 2 stored in buffer location 64a and to send the retrieved data chunk 2 to the RPA memory controller 60. The RPA memory controller 60 then sends chunk 2 across the system bus 28 and through the host interface circuit 16 to the host device 31.

It should be appreciated that the degraded read request routine 200 reduces the data traffic across the memory bus 66 when compared to a similar degraded read request routine performed by the prior art. In particular, the number of chunks (Y) that are transferred across the memory bus 66 when executing the routine 200 may be determined from equation (2):

$$Y = \left(2 + \frac{1}{N}\right) \cdot X \quad (2)$$

where X is the number of data chunks to be transferred to the host device 31, N is the number of data disk drives associated with the disk array 33, and Y is the resulting number of data and parity chunks transferred across the memory bus 66 as a result of transferring X data chunks.

Therefore, disk array controller 10 in a degraded read operation transfers nine chunks across the memory bus 66 in order to read a stripe from the disk array 33 having four data disk drives and one parity disk drive. That is:

$$Y = \left(2 + \frac{1}{4}\right) \cdot 4 = 9$$

Thus, in the embodiment being described, execution of routine 200 provided an approximately 30% reduction (13 chunks—9 chunks)/13 chunks in data traffic across the memory bus as compared to the prior art.

The RPA memory controller 60 may also write the restored chunk 2 data into the RPA memory 22 for subsequent use during a disk caching operation. If the RPA memory controller 60 is implemented to write the restored chunk 2 data into the RPA memory 22, then the number of data transfers as a result of a degraded read operation may be determined from above equation (1) instead of above equation (2).

Furthermore, the data requested by the host device 31 may be transferred to the host device 31 out of order (i.e. chunk 1, chunk 3, chunk 4, and then chunk 2) depending upon which disk drive of disk array 33 fails. As a result, a data transfer protocol may be required which permits out of order transfers of data chunks. However, if the degraded read operation is performed in a similar manner as the write operation described above (i.e. as chunks are transferred from the disk array 33 to the RPA memory 22, they are XORed with data in a buffer of the intermediate parity buffer 64), then the data may be transferred to the host device 31 in order. It should be appreciated, however, that this in order implementation of degraded read operations increases the complexity and cost of the RPA circuit 20.

In optimum read operations, there is no disk drive failure associated with the disk array 33. Thus, it should be appreciated that there is no need to read parity information from the parity disk drive into the RPA memory 22, or to send the chucks of data to the intermediate parity buffer 64 after the chunks of data have been written into the RPA memory 22. In particular, in optimum read operations, the read data is transferred from the disk array 33 through the IOP 24, across the system bus 28, through the RPA memory controller 60, across the memory bus 66, and into the RPA memory 22. The processor 12 then schedules a read operation where the chunks of read data are transferred out of the RPA memory 22, across the memory bus 66, through the RPA memory controller 60, across the system bus 28, through the host interface 16 and to the host device 31.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for transferring data from a first device to a second device connected by a controller that includes a parity generator, a parity buffer, and a memory, comprising the steps of:

transferring first data from the first device to the memory;
   transferring second data from the first device to the memory;
   transferring said first data from the memory to the second device ;
   storing said first data in the parity buffer as first intermediate parity data in response to said first data being transferred to the second device;
   transferring said second data from the memory to (i) said second device and (ii) the parity generator; and
   generating second intermediate parity data with said parity generator in response to the parity generator receiving said second data, said second intermediate parity data being generated from said first intermediate parity data and said second data.

2. The method of claim 1, further comprising the step of:
   transferring parity information from the controller to said second device, wherein said parity information is based upon said second intermediate parity data.

3. The method of claim 1, further comprising the step of:
   storing said second intermediate parity data in said parity buffer.

4. The method of claim 1, further comprising the step of:
   storing in the memory, parity information that is based on said second intermediate parity data.

5. The method of claim 1, wherein the generating step further comprises the step of:
   performing a bit-wise exclusive-OR of said second data with said first intermediate parity data stored in the parity buffer to obtain said second intermediate parity data.

6. The method of claim 1, further comprising the steps of:
   failing to transfer third data from the first device to the memory;
   transferring parity information from the first device to the memory in response to said failing step;
   transferring said parity information from the memory to the parity generator;
   generating third intermediate parity data with the parity generator in response to the parity generator receiving said parity information, said third intermediate parity data being generated from said second intermediate parity data and said parity information; and
   transferring recovered third data from the controller to the second device, wherein said recovered third data is based upon said third intermediate parity data.

7. A method for transferring data from a first device to a second device connected by a controller that includes a parity generator, a parity buffer and a memory, comprising the steps of:

transferring first data from the first device to the memory;
   storing said first data in the parity buffer as first intermediate parity data in response to said first data being transferred to the memory;
   transferring second data from the first device to (i) the memory and (ii) the parity generator;
   generating second intermediate parity data with said parity generator in response to the parity generator receiving said second data, said second intermediate parity data being generated from said first intermediate parity data and said second data,
   transferring said first data from the memory to the second device; and
   transferring said second data from the memory to the second device.

8. The method of claim 7, further comprising the step of:
   transferring parity information from the controller to said second device, wherein said parity information is based upon said second intermediate parity data.

9. The method of claim 7, further comprising the step of:
   storing said second intermediate parity data in said parity buffer.

10. The method of claim 7, further comprising the step of:

storing in the memory, parity information that is based on said second intermediate parity data.

11. The method of claim 7, wherein the generating step comprises the step of:

performing a bit-wise exclusive-OR of said second data with said first intermediate parity data stored in the parity buffer to obtain said parity data.

12. The method of claim 7, further comprising the steps of:

failing to transfer third data from the first device to the memory;

transferring parity information from the first device to the memory and the parity generator in response to said failing step;

generating third intermediate parity data with the parity generator in response to the parity generator receiving said parity information, said third intermediate parity data being generated from said second intermediate parity data and said parity information; and transferring recovered third data from the controller to the second device, wherein said recovered third data is based upon said third intermediate parity data.

13. A disk array controller for connecting a host device to a disk array having a first disk upon which is stored first data, a second disk upon which is stored second data, and a third disk upon which is stored parity information that is based upon the first data and the second data, the disk array controller comprising:

a memory;

a parity buffer;

a parity generator coupled to said parity buffer; and, a parity controller coupled to said memory and said parity generator, said parity controller configured to (i) transfer first data from the first disk to said memory; (ii) transfer the parity information from the third disk to said memory; (iii) transfer said first data from said memory to the host device and to said parity generator; and (iv) transfer the parity information from the third disk to said parity generator if a transfer of the second data from said second disk to said memory has failed;

wherein said parity generator is configured to (i) store said first data in said parity buffer as first intermediate parity data, and (ii) generate recovered second data that is based on said first intermediate parity data and said parity information.

14. The disk array controller of claim 13, wherein:

said parity controller is further configured to transfer said recovered second data to the host device.

15. The disk array controller of claim 14, wherein:

said parity controller is further configured to transfer said recovered second data to said memory.

16. The disk array controller of claim 15, wherein:

said parity generator performs a bit-wise exclusive-OR of said first intermediate parity data with said parity information to obtain second intermediate parity data, wherein said recovered second data is based upon said second intermediate parity data.

17. A disk array controller for connecting a host device to a disk array having a first disk, a second disk, and a third disk, the disk array controller comprising:

a memory;

a parity buffer;

a parity generator coupled to said parity buffer; and a parity controller coupled to said memory and said parity generator, said parity controller configured to (i) transfer first data from the host device to said parity generator and said memory; (ii) transfer second data from the host device to said parity generator and said memory; (iii) transfer said first data from said memory to the first disk; (iv) transfer said second data from said memory to the second disk; and (v) transfer parity information to the third disk from either said parity generator or said memory;

wherein said parity generator is configured to (i) store said first data in said parity buffer as first intermediate parity data; and (ii) determine said parity information from said second data and said first intermediate parity data stored in said parity buffer.

18. The disk array controller of claim 17, wherein:

said parity controller is further configured to transfer said parity information to said memory.

19. The disk array controller of claim 18, wherein:

said parity generator performs a bit-wise exclusive-OR of said first intermediate parity data with said second data to obtain second intermediate parity data, wherein said parity information is based upon said second intermediate parity data.

* * * * *